No. 885,462. PATENTED APR. 21, 1908.
J. B. FLETCHER.
FLUID MOTOR.
APPLICATION FILED JULY 31, 1906.
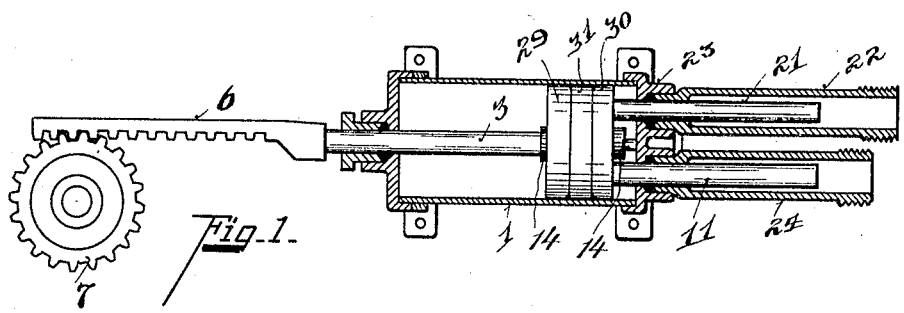
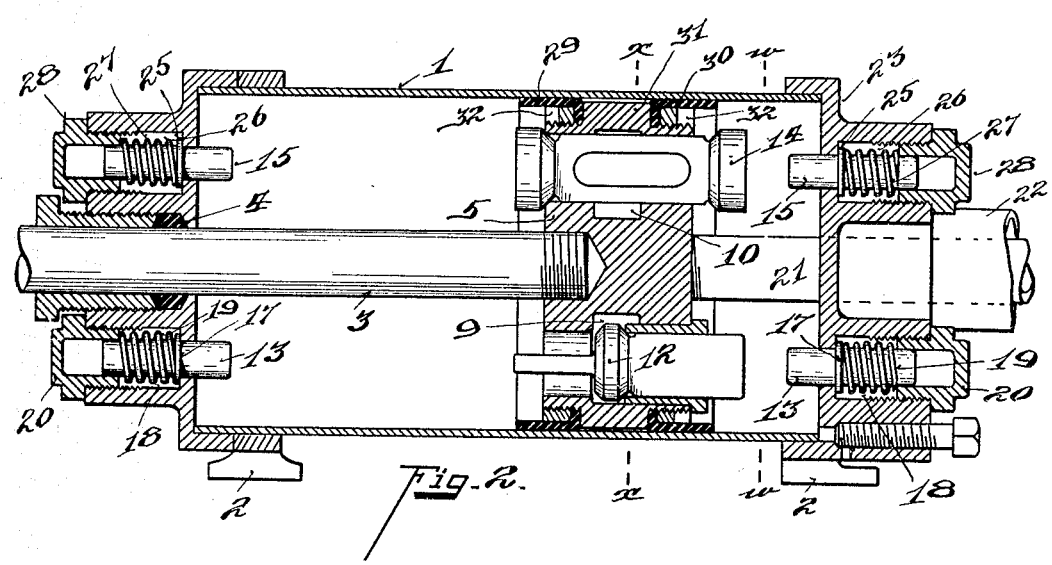
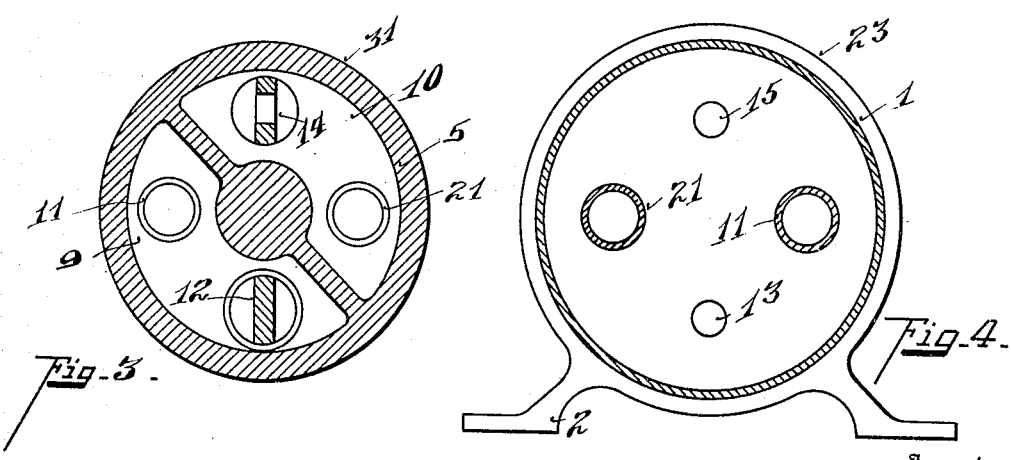
Witnesses
Oliver B. Kaiser
Leo O'Donnell
Inventor
John B. Fletcher
By Wood & Wood
Attorneys

UNITED STATES PATENT OFFICE.

JOHN B. FLETCHER, OF NEWPORT, KENTUCKY.

FLUID-MOTOR.

No. 885,462.　　　　Specification of Letters Patent.　　　Patented April 21, 1908.

Application filed July 31, 1906. Serial No. 328,618.

*To all whom it may concern:*

Be it known that I, JOHN B. FLETCHER, a citizen of the United States, residing at Newport, in the county of Campbell and State of Kentucky, have invented certain new and useful Improvements in Fluid-Motors, of which the following is a specification.

This invention relates to a fluid motor, especially adapted to be driven by fluid under pressure.

The object of this invention is to provide a double acting piston with valves and valve chambers arranged in the piston head, the parts so constructed that the valves are automatically tripped near each end of the stroke by contact of the valves with trips seated and projected from the face of the cylinder heads. The parts are so arranged that fixed supply and exhaust pipes are attached at one end of the cylinder, the supply and discharge of the fluid into and from the chambered piston head from one end, is accomplished by means of telescopic pipes traveling with the piston but sliding within the stationary pipes on the outside head of the cylinder.

Various features of the invention are more fully set forth in the description of the accompanying drawings, forming a part of this specification, in which:—

Figure 1 is a central longitudinal section of the cylinder and pipes, showing the piston and piston valves in elevation. Fig. 2 is an enlarged central section of the cylinder, piston and valve. Fig. 3 is a section on line x, x, Fig. 2. Fig. 4 is a section on line w, w, Fig. 2.

1 represents a cylinder. 2 represents the base supports for the same.

3 represents the piston rod connected to the piston 5.

4 represents a stuffing-box for the piston rod 3.

6 represents the rack bar.

7 represents a gear wheel with which the teeth of the rack bar mesh when used for imparting rotary motion.

Gear 7 drives an ordinary crank shaft. When reciprocating motion is desired a straight shaft is employed. 5 represents a hollow piston divided transversely into two chambers 9, 10. Chamber 9 being the passageway for the induction pipe 11 to the opposite sides of the piston head for driving the same, which is alternately accomplished by means of the inlet valve 12.

10 represents the exhaust chamber which is controlled by the exhaust valve 14, to be hereinafter described.

21 represents an exhaust pipe leading into the chamber 10 of the piston 5 and adapted to telescope into a pipe 22 secured to the piston head 23. 24 represents a pipe similar to pipe 22 likewise secured into the head 23 for receiving the induction pipe 11. These pipes 22, 24, are stationary and at their free ends are provided with coupling means to suitably connect the same to a service pipe and waste pipe respectively.

As both the inlet and exhaust valves are to be tripped automatically by devices mounted in the cylinder head, it is necessary that these tripping devices be positive and durable and so arranged that should foreign substance, such as mud and other impurities, be found in the driving fluid, such as water, which is usually employed, the tripping instrumentalities will not be clogged or interfered with in action. Again, as accidents are apt to occur in an automatic motor, it is important that the trips should be easily and quickly got at and repaired or renewed without taking the motor apart. With my device such changes or renewals may be quickly effected by simply cutting off the driving fluid and taking off the screw caps protecting the trips. I accomplish this result in the following manner:—13 represents the trips which actuate the inlet valve 12 at either end of the piston to admit the fluid pressure into that end of the cylinder to which said trip is attached. 15 represents the trips which in like manner actuate the exhaust valve 14 for allowing the fluid to be exhausted in advance of the driving action of the piston. It is also very desirable to have the trips yield so as to prevent any jar upon the valve chamber and valve, and at once return to normal position. It is also desirable to adjust the projection of the trip into the cylinder to the proper position, as well as to renew the parts when worn. I accomplish these results in the following manner:—18 represents cylindrical chambers upon the outside end of the cylinder head for supporting the trips which actuate the inlet valve. 19 represents a coil spring around the trip rod, one end of which seats against a shoulder 17, and the other end against the hollow cap 20 into which the trip projects. The tension of the spring can be readily regulated in this manner, or as occasion requires it. The spring is thoroughly protected and held in position for use and readily accessible without taking the cylinder and piston apart. Duplicate means are employed for tripping the exhaust valve, likewise formed in the cylinder heads in which 25 represents a shoulder formed on the trips 15, said trips projecting into the chambers 26 formed in the cylinder heads. 27 represents a coil spring imparting tension to the trips and 28 represents a cap for securing the spring and trips in position. It will be seen that the caps 20, 28, are bored to receive one end of the trips, thereby maintaining the same in an alined position enabling a free and easy operation.

The point of cut-off of the valves is regulated by the length of the trip stems projecting into the cylinder. It is also an important advantage.

In order to effectively seal the chambers formed by the piston in its movement, the following packing means is employed:—29, 30, represents cup leather packings seating against the flange 31 formed on the periphery of the piston and 32 represents locking rings screw threaded on the periphery of the piston for securely holding the cup packings in position.

I have found by experience that the construction herein shown is simple, effective and durable, and the motor can be readily adjusted to varying requirements according to the conditions under which it is to be operated.

Having described my invention, I claim:—

In a water motor, a cylinder, a piston having supply and exhaust compartments, supply and exhaust pipes carried by said piston and leading into their respective compartments, supply and exhaust valves in said piston compartment, said supply and exhaust pipes lying parallel with each other, cylinder heads detachably connected to said cylinder, sleeve projections extending from said head provided with differential diameter bores, a hollow cap detachably secured to said sleeve projections, a spring actuated plunger trip rod slidably mounted within said caps and smaller bores of said head and projecting into the cylinder in a position to trip the valves at the opposite ends of the piston stroke, substantially as described.

In testimony whereof, I have hereunto set my hand.

JOHN B. FLETCHER.

Witnesses:
OLIVER B. KAISER,
LUISE BECK.